United States Patent
Simmons et al.

[11] 3,904,273
[45] Sept. 9, 1975

[54] APODISED APERTURE USING ROTATION OF PLANE OF POLARIZATION

[75] Inventors: William W. Simmons, Alamo; Gilbert W. Leppelmeier, Livermore; Bertram C. Johnson, Sunnyvale, all of Calif.

[73] Assignee: The United States of America as represented by the United States Energy Research and Development Administration, Washington, D.C.

[22] Filed: Mar. 18, 1974

[21] Appl. No.: 452,165

[52] U.S. Cl............................... 350/151; 350/205
[51] Int. Cl.²......................................... G02F 1/22
[58] Field of Search.............. 350/151, 175 DR, 205

[56] References Cited
UNITED STATES PATENTS 3,663,087   5/1972   Guillet et al..................... 350/151 X
3,679,289   7/1972   Goldstein........................... 350/150

Primary Examiner—John K. Corbin
Attorney, Agent, or Firm—John A. Horan; F. A. Robertson; L. E. Carnahan

[57] ABSTRACT

An apodised aperture based on the rotation of plane of polarization producing desirable characteristics on a transmitted light beam such as beam profiling in high flux laser amplifier chains. The apodised aperture is made with a lossless element by using one or more polarizers and/or analyzers and magneto-optical Faraday means for selectively rotating the plane of polarized radiation over the cross section to effect the desired apodisation.

2 Claims, 3 Drawing Figures

APODISED APERTURE USING ROTATION OF PLANE OF POLARIZATION

BACKGROUND OF THE INVENTION

The invention described herein was made in the course of, or under, Contract No. W-7405-ENG-48 with the United States Atomic Energy Commission.

This invention relates to apodised apertures, particularly to apodised apertures for optical beam shaping, and more particularly to apodised apertures using the rotation of plane of polarization for optical beam shaping.

It is known that a beam of polarized light can be attenuated (uniformly) by passing it through a rotatable analyzer (see "Fundamentals of Optics," by Jenkins and White, third Edition, McGraw-Hill, 1957, Chapter 24). By rotating the analyzer through angle $\theta$, it is possible to obtain a $\cos^2 \theta$ variation of intensity, i.e., from maximum at $\theta = 0$ to minimum at $\theta = \pi/2$. By inserting an element in which the plane of polarization can be varied selectively for different elemental areas over the beam wavefront, it is possible to secure controlled attenuation over the beam cross section, i.e., to make an apodised aperture. Thus, in principle, an aperture whose transmission varies from point-to-point over its cross-section can produce desirable characteristics on a transmitted light beam; examples are suppression of secondary diffraction maxima (see M. Born et al, Principle of Optics, Second Revised Edition, Pergamon Press, 1964, page 417), and beam profiling in high flux laser amplifier chains (see A. J. Campillo et al, Appl. Phys. Lett. 23, 85 (1973). The possibility of making such apertures by utilizing an electrooptic crystal and polarizer in combination is disclosed in U.S. Pat. No. 3,679,289, issued July 25, 1972 to R. L. Goldstein.

Practical application of such apertures depends in part on the diameter of the beam which must be shaped. While electrooptic crystals (Pockels cells) will suffice for small diameters, they are not effective for larger diameter apertures as use is limited by the availability of high optical quality crystals. Thus, a need exists in the prior art for an apodised aperture that is capable of effectively shaping large diameter light beams.

SUMMARY OF THE INVENTION

The prevent invention fills the need of the prior art by providing an optical beam shaping device using polarization rotation which is readily scalable to aperture diameters large than 50 mm, and involves a magneto-optical Faraday rotator. The Faraday rotator technique of this invention is particularly well suited to high power laser beam shaping applications; and is capable of handling high intensity beams and of profiling such beams to provide smooth skirt truncation with high aperture filling factor.

Broadly, the invention involves a magneto-optical Faraday rotator in combination with polarizers and/or analyzers, the rotator being composed of a glass rod located within the inhomogeneous magnetic field provided by counterwound solenoids. The polarization plane of throughput monochromatic light is rotated through an angle proportional to the local magnetic field. In the axisymmetric embodiment illustrated, the rotation angle ($\theta$) is a function of the distance ($r$) from the geometric center line of the aperture, the transmission ($T$) of the aperture (placed between parallel polarizers) is $T(r) = \cos^2 \theta (r)$.

Therefore, it is an object of this invention to provide an apodised aperture based on rotation of plane of polarization.

A further object of invention is to provide an optical beam shaping device using polarization rotation.

Another object of the invention is to provide a magnetooptical Faraday rotator placed between parallel polarizers for handling high intensity beams, and for profiling these beams to provide smooth skirt truncation with high aperture filling factor.

Another object of the invention is to provide a Faraday rotator optical beam shaping technique readily scalable to large diameter apertures.

Other objects, not set forth above, will become readily apparent to those skilled in the art from the following description and accompanying drawings.

DESCRIPTION OF THE INVENTION

An apodised aperture is an optical element with a transmission which varies over the cross section. Such an aperture can be made with lossless elements by using one or more polarizers and/or analyzers and means for selectively rotating the plane of polarized radiation over the cross section to effect the desired apodisation. This invention utilizes a magneto-optical Faraday cell or device for selectively rotating the plane of polarized radiation, such as a high power laser beam, in such an apodised aperture, whereby the beam may be shaped as desired.

Figure 1:
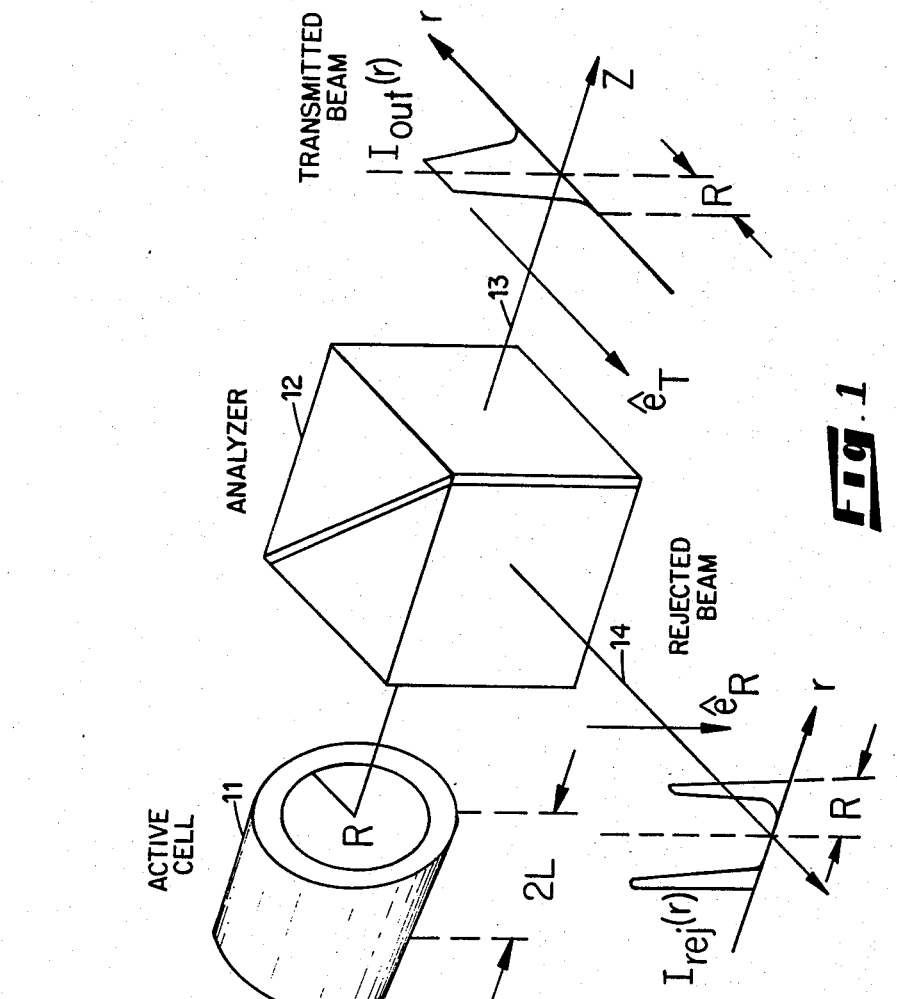
FIG. 1 is a schematic representation of an apodised aperture based on polarization rotation.
Figure 2:
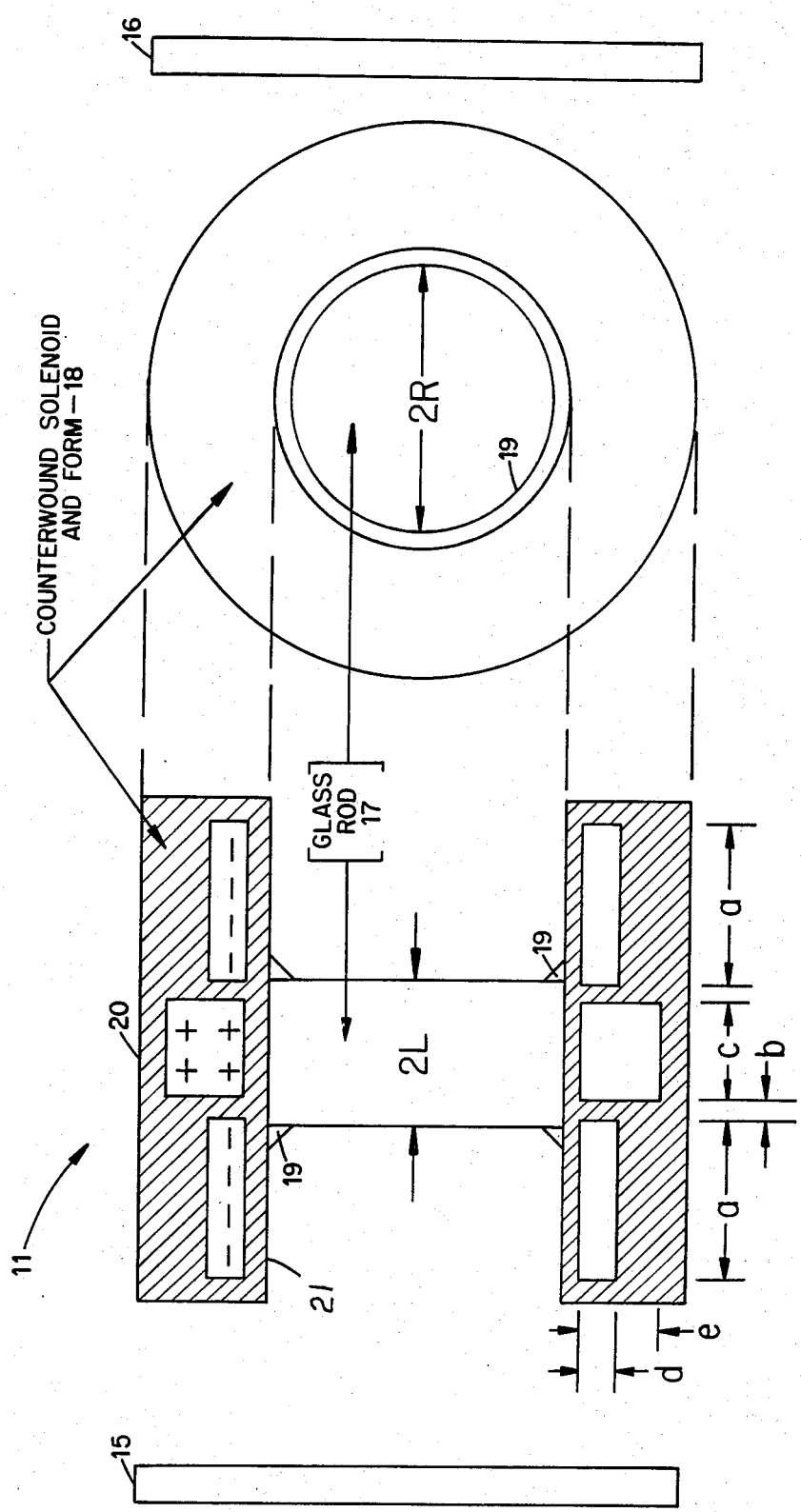
FIG. 2 is a view, partially in cross-section, illustrating a counterwound solenoid for generating inhomogeneous magnetic field distribution capable of producing the transmission function of FIG. 1.

FIG. 1 illustrates the general configuration of a beam shaping device, utilizing an apodised aperture based on polarization rotation, described hereinafter in greater detail with respect to FIGS. 2–4. For simplicity, an input beam indicated at 10 is taken to be a plane polarized, collimated, monochromatic wave of unit intensity [$I_{in}(r) = 1$]. Polarization vectors associated with the beam are indicated by $\hat{e}$. The input wave propagates along the Z-axis, indicated by legend, through an active cell 11, including a glass rod (Faraday effect) of appropriate geometry, followed by a plane polarizer or analyzer 12 oriented at an angle $\theta_o$ with respect to the incident polarization vector, whereby a transmitted beam indicated at 13 and traveling along the Z-axis, and a rejected beam indicated at 14 traveling transverse to the Z-axis, result. Beams 10, 13 and 14 have waveforms as indicated respectively at $I_{in}(r)$, $I_{out}(r)$, and $I_{rej}(r)$, with the respective polarization vectors indicated at $\hat{e}_I$, $\hat{e}_T$, and $\hat{e}_R$.

If a magnetic field, $\vec{B}$, is applied to the rod of active cell 11, the transmission, $T(r)$, is given by:

$$T(r) = \frac{I_{out}(r)}{I_{in}(r)} = T_{max} \cos^2 (\theta(r) + \theta_o) \quad (1)$$

where
$$\theta(r) = \int_0^{2L} \vec{VB}(r, Z) \cdot d\vec{Z} \quad (2)$$

where ($r$) is the radial distance, $V$ is equal to the material Verdet constant, and $Z$ is the longitudinal position or "longitudinal variable of integration."

Assuming that $\vec{B}$ is axisymmetric about the aperture center, $\theta$ and $T$ then become functions of the radial distance $r$ only. Radial variation of $T$ is achieved through careful control of the inhomogeneous ("fringing") field distribution within the active material.

A transmission function that is near unity for $r$ near zero, and that decreases smoothly and continuously to zero at $r$ equal to (or slightly less than) radius $R$ of FIG. 1, is useful and straightforward to obtain. An appropriate Faraday effect geometry for this transmission function is shown in FIG. 2. The embodiment illustrated in FIG. 2 comprises generally an active cell 11 positioned between a pair of polarizers and/or analyzers generally indicated at 15 and 16. Cell 11 is of the magneto-optical Faraday effect type and comprises a glass rod 17 having a length 2L and diameter 2R surrounded by a solenoid 18 secured to rod 17 by appropriate bonding material 19. Solenoid 18 comprises a short central coil section 20 having clockwise windings, as indicated by the positive signs, which provides a positive $\delta B_z/\delta r$ in the midplane, and outer coil sections 21 having counter-clockwise windings, as indicated by the negative signs, which approximate an oversped Helmholtz pair (negative $\delta B_z/dr$ in the midplane). midplane). geometry is chosen to null approximately the net magnetic field at the origin when the sections carry equal (and opposite) current densities. It can easily be shown that this coaxial counterwound configuration results in polarization rotation of opposite senses along the center line and near the solenoid inner diameter (for finite L); hence, the solenoid produces an "over-compensated" field distribution.

The dimensions of glass rod 17 and solenoid 18, by way of example are: $a = 30$ mm; $b = 5$ mm; $c = 15$ mm; $d = 6$ mm; $e = 12$ mm; $2L = 25$ mm; $2R = 50$ mm. The windings are in series, with 20 turns per section of number 8 gauge copper wire. In actual operation polarizers 15 and 16 would be spaced equally from active cell 11 or at such location necessary to produce the desired function. While not shown, an appropriate power supply and variable voltage control means are operatively connected to solenoid 18.

Figure 3:
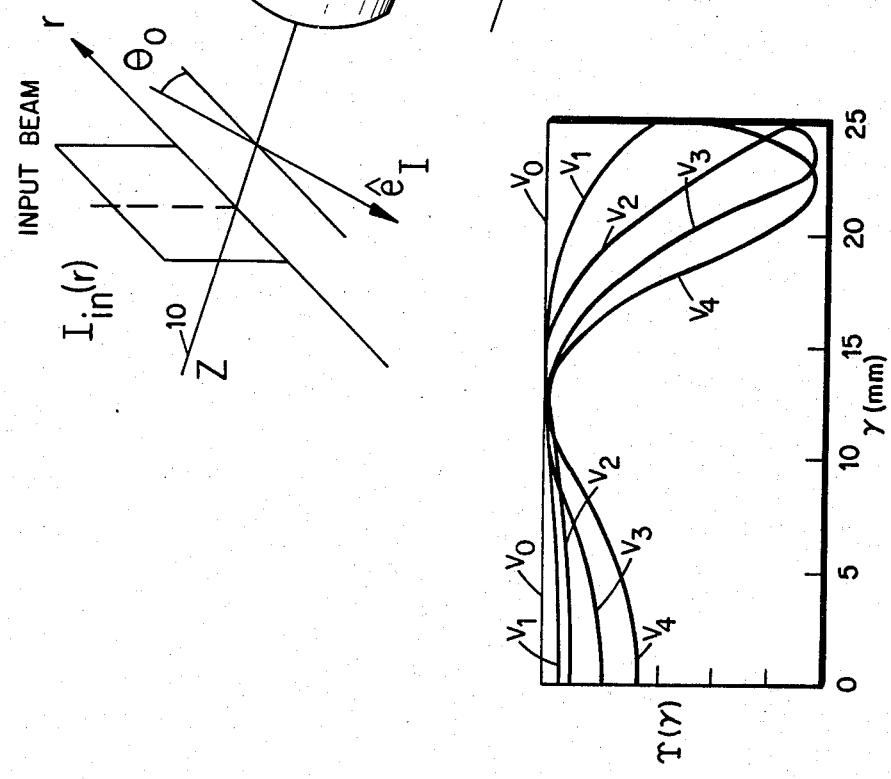
FIG. 3 graphically illustrates aperture transmission vs. radius for the coil configuration of the FIG. 2 Faraday geometry for different values of solenoid current.

Theoretical transmission functions, for $\theta_o = 0$, for several values of solenoid current are shown in FIG. 3. Aperture transmission vs. radius [$T(r)$ vs. $r$] for the solenoid configuration of FIG. 2 with supply voltage to coil being indicated by $V_o = 0$, $V_1 = 1$, $V_2 = 2$, $V_3 = 3$, and $V_4 = 4kV$. While not shown, photographs corresponding to the curves of FIG. 3 were simultaneously taken of the (uniformly) illuminated aperture. To obtain these photographs the central portion of an expanded, collimated beam of 5353 Å light from a pulsed xenon ion laser illuminated a $2R = 50$ mm diameter, 25 mm length glass rod having a $V = 0.32$ minutes/oersted-cm at 5353 Å. Polaroid sheet polarizer was placed between the glass and the camera focal plane (at which a translucent sheet was located). Laser pulse duration was approximately 0.5 $\mu$sec, and was set to occur at the peak of the half-sinusoidal energizing current pulse, of base duration 300 $\mu$sec, applied to the solenoid. Maximum energy available from the magnetic power supply was 9 kilojoules (720$\mu$ F at 5 kV). Photographs were made for both $\theta_o = 0$ and $\theta_o = \pi/2$, and good agreement with computed $T(r)$ was obtained.

The device described above utilizes a lossless linear element. Since it does not rely on absorption to attenuate the beam selectively, damage and phase distortion induced by thermal and other non-linear effects in the absorbing medium are consequently avoided. Such devices have direct application to beam profiling in multistage, large aperture, high intensity amplifiers, where it is desirable to fill uniformly as much as possible of the available amplifier cross-section while minimizing inevitable diffraction ripples on the propagating wavefront.

With regard to multistage solid state amplifiers, three additional features of this device are noted. First, calculations show that moderate beam divergence makes little difference in $T(r)$ vs. $r$ characteristics. Second, the solenoid may be designed as a part of the flashlamp ballast circuitry for an adjoining amplifier, thus avoiding the expense of extra power supplies. Third, it is possible to provide time varying fields, thereby providing beam shapes that are tailored functions of both radius and time.

It has thus been shown that the present invention provides a device incorporating an apodised aperture that utilizes a Faraday rotator polarization rotation to achieve radially variable transmission characteristics. The device is particularly well suited to high power laser beam shaping applications and is capable of handling high intensity beams, and of profiling these beams to provide smooth skirt truncation with high aperture filling factor. Using more sophisticated geometries the device is capable, in principle, of producing any transverse beam profile that may be required. The Faraday rotator is readily scalable to aperture diameters larger than 50 mm.

While a particular embodiment of the invention has been illustrated and described, modifications will become apparent to those skilled in the art, and it is intended to cover in the appended claims all such modifications as come within the spirit and scope of the invention.

What we claim is:

1. In an apodised aperture for optical beam shaping utilizing one or more polarizers and means for selectively rotating the plane of polarized radiation over the cross-section to effect the desired apodisation, the improvement comprising a magneto-optical Faraday cell constituting said means for selectively rotating the plane of polarized radiation, said Faraday cell comprising a centrally located glass rod and a counterwound solenoid for producing an inhomogeneous magnetic field within which said glass rod is located, said solenoid of said Faraday cell comprising a central section containing clockwise windings for producing a positive magnetic field, and outer sections located an opposite sides of said central section containing counter-clockwise windings for producing a negative magnetic field.

2. The apodised aperture defined in claim 1, wherein said counterwound solenoid is secured coaxially about the periphery of said glass rod such that said central section of said solenoid is located radially about said glass rod and said outer sections of said solenoid project longitudinally of said glass rod.

* * * * *